United States Patent
Chiu (10) Patent No.: US 9,529,090 B2
(45) Date of Patent: Dec. 27, 2016

(54) METHOD OF SATELLITE STATUS JUDGMENT

(75) Inventor: Shang-Ming Chiu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 1335 days.

(21) Appl. No.: 13/226,426

(22) Filed: Sep. 6, 2011

(65) Prior Publication Data
US 2012/0056783 A1 Mar. 8, 2012

(30) Foreign Application Priority Data

Sep. 8, 2010 (CN) .......................... 2010 1 0275686

(51) Int. Cl.
*G01S 19/28* (2010.01)
*G01S 19/21* (2010.01)

(52) U.S. Cl.
CPC ................ *G01S 19/28* (2013.01); *G01S 19/21* (2013.01)

(58) Field of Classification Search
CPC .................................. G01S 19/21; G01S 19/28
See application file for complete search history.

(56) References Cited

U.S. PATENT DOCUMENTS

| | | | |
|---|---|---|---|
| 4,849,961 A * | 7/1989 | Sturza | G01S 19/243 370/320 |
| 5,883,594 A * | 3/1999 | Lau | G01S 19/252 342/357.63 |
| 7,295,155 B2 * | 11/2007 | Wakamatsu | 342/357.67 |
| 7,498,873 B2 * | 3/2009 | Opshaug et al. | 329/315 |
| 2002/0050944 A1 * | 5/2002 | Sheynblat | G01C 21/206 342/357.25 |
| 2003/0218568 A1 * | 11/2003 | Kober | G01S 19/21 342/357.29 |
| 2006/0068699 A1 * | 3/2006 | Lee et al. | 455/3.02 |
| 2007/0149113 A1 | 6/2007 | Fitzrandolph | |

(Continued)

FOREIGN PATENT DOCUMENTS

| | | |
|---|---|---|
| JP | 3156395 | 7/1991 |
| JP | 2006126005 | 5/2006 |

(Continued)

OTHER PUBLICATIONS

Wright, D, Grego, L. et al. The Physics of Space Security. American Academy of Arts & Sciences [online], 2005 [retrieved on Jun. 18, 2014]. Retrieved from the Internet< URLhttp://ucsusa.org/assets/documents/nwgs/physics-space-security.pdf>.*

(Continued)

*Primary Examiner* — Bernarr Gregory
*Assistant Examiner* — Fred H Mull (57) ABSTRACT

A method of satellite status judgment and computer program includes steps of selecting a plurality of observation satellites from a plurality of satellites according to a first condition, selecting, by the positioning apparatus, each of the observation satellites in turn as a target satellite, obtaining a signal variation slope of a first signal of a target satellite during a first observation time period, determining whether the target satellite should be masked according to the slope of the first signal, generating a prompt message when it is determined that the target satellite should be masked, and masking positioning signals transmitted from the target satellite according to the prompt message.

14 Claims, 6 Drawing Sheets

(56) References Cited

U.S. PATENT DOCUMENTS

| | | | | |
|---|---|---|---|---|
| 2007/0258366 | A1* | 11/2007 | Imamura | H04L 5/0046 370/230 |
| 2008/0174479 | A1* | 7/2008 | Sugimoto | 342/357.01 |
| 2009/0195446 | A1* | 8/2009 | Liao et al. | 342/357.1 |
| 2009/0243914 | A1* | 10/2009 | Song | G01S 19/23 342/169 |
| 2010/0148827 | A1* | 6/2010 | Olgaard | G01S 19/23 327/100 |
| 2010/0201568 | A1* | 8/2010 | Han | G06T 17/05 342/357.67 |
| 2012/0165045 | A1* | 6/2012 | Takahashi | G01C 21/20 455/456.3 |
| 2012/0169538 | A1* | 7/2012 | Singh | G01S 19/30 342/357.69 |

FOREIGN PATENT DOCUMENTS

| | | |
|---|---|---|
| JP | 2009243940 | 10/2009 |
| TW | 200940958 A | 10/2009 |

OTHER PUBLICATIONS

Jaworski, M.; Marciniak, M., "Counteracting of stimulated Brillouin scattering in externally modulated lightwave AM-CATV systems," Laser and Fiber-Optical Networks Modeling, 2000. Proceedings of LFNM [online] 2000. 2nd International Workshop on , vol., No., pp. 71,73, 2000 doi: 10.1109/LFNM.2000.854044. URL: http://ieeexplore.ieee.org/stamp/stamp.*

In turn. (2013). The American Heritage Dictionary of Idioms. Boston, MA: Houghton Mifflin. Retrieved from http://search.credoreference.com/content/entry/hmidiom/in_turn/0.*

Optimalize or optimalise. (2014). Collins English Dictionary. London, United Kingdom: Collins. Retrieved from http://search.credoreference.com/content/entry/hcengdict/optimalize_or_optimalise/0.*

Optimize or optimise. (2014). Collins English Dictionary. London, United Kingdom: Collins. Retrieved from http://search.credoreference.com/content/entry/hcengdict/optimize_or_optimise/0.*

MathWorks, Integrate and Dump, http://www.mathworks.com/help/comm/ref/integrateanddump.html, accessed on Jul. 13, 2016.*

* cited by examiner

METHOD OF SATELLITE STATUS JUDGMENT

BACKGROUND

1. Technical Field

The present invention relates to a method of satellite status judgment, more particularly, the present invention relates to a method of satellite status judgment according to signal variation slope signals of a satellite.

2. Description of the Related Art

Generally global positioning systems (GPS) employ four positioning satellite operating in coordination with positioning apparatus to position the location of the positioning apparatus. Signals transmitted by a satellite comprises coordinate data of the satellite and transmitting time of each signal, and positioning chip in the positioning apparatus employs the signals to calculate the location of the positioning apparatus.

When a GPS employs four satellites to position, any one satellite is affected would result in a positional error in three-dimension space. One reason of satellite signal errors is probable external mask of landform interferes with satellite signals being transmitted to the positioning apparatus. Relative positions of the four selected satellites to the positioning apparatus may affect GPS positioning effect.

No matter Satellite Based Augmentation Systems (SBAS), Assisted Global Positioning System (AGPS), or Differential Global Positioning System (DGPS), have a common problem that the satellite signals can be provided only when the users is near the base station or in an available region covered by satellite signals. When the satellite signals are masked, the systems would not perform well because of affection of signal strength.

BRIEF SUMMARY

The application provides a method of satellite status judgment comprising steps of: obtaining a variation slope of a first signal of a target satellite at a first observation time period; determining whether the target satellite is under a situation of being masked according to the variation slope of the first signal; and generating a prompt message when the target satellite is under the situation of being masked.

The application also provides a computer program, wherein when the software is implemented, an electronic apparatus performs a method of satellite status judgment. The method comprises steps of: obtaining a variation slope of a first signal of a target satellite at a first observation time period; determining whether the target satellite is under a situation of being masked according to the variation slope of the first signal; and generating a prompt message when the target satellite is under the situation of being masked.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

For facilitating to clarify the application, in the application, these satellites whose signals can be received by the positioning apparatus are defined as valid satellites, and the amount of the valid satellites in sky is represented by N1. In addition, to limit the amount of the satellites, elevation angle range and signal strength can be selected as conditions to exclude the satellites with lower observation character. These satellites satisfied with the conditions of elevation angle range and signal strength are defined as observation satellites, and the amount of the observation satellites is represented by N2. A positioning apparatus needs to employ four satellites to position the location of the positioning apparatus, thus, the four satellites are identified as positioning satellites. The amounts of these kinds of satellites is satisfied with a formula as below: N1 ≥N2≥4.

Figure 1:
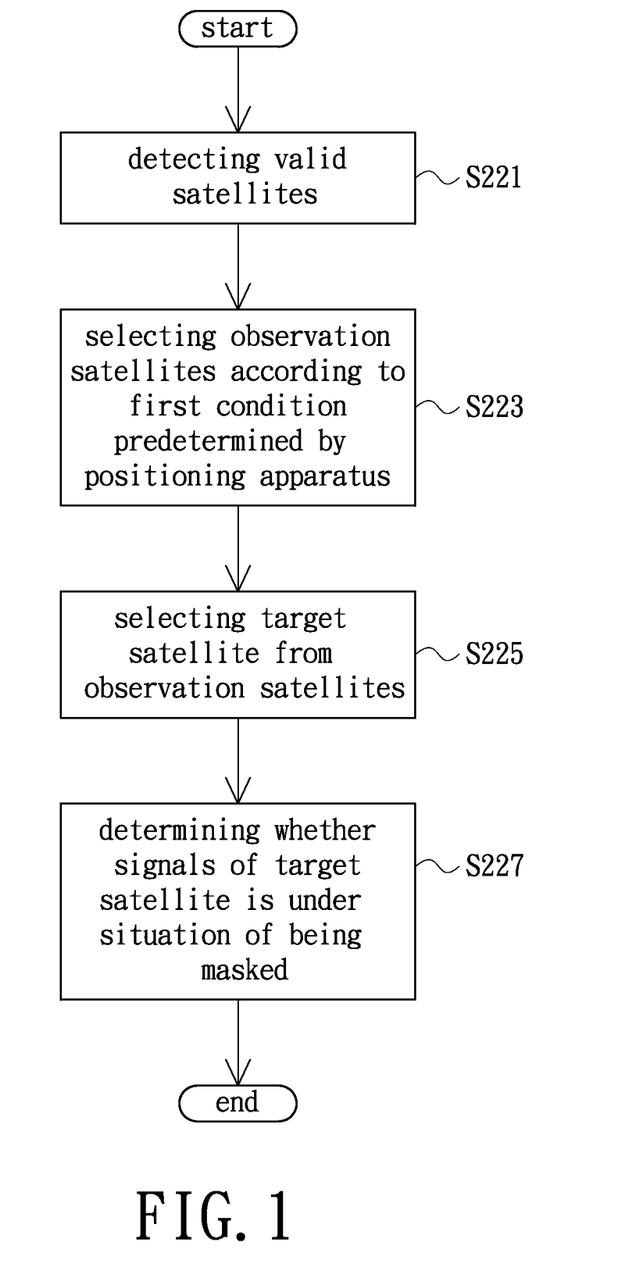
FIG. 1 is a flowchart of a method of selecting target satellites according to a preferred embodiment of the present invention.

Please refer to FIG. 1, which is a flowchart of a method of selecting target satellites according to a preferred embodiment of the present invention. Firstly, the positioning apparatus detects the valid satellites (S221), after that, selecting observation satellites according to a first condition predetermined by the positioning apparatus (S223), then selecting target satellites from the observation satellites (S225) and determining if the satellite signals from the target satellites are masked (S227).

Wherein, the first condition may be determined by elevation angle of the satellites and/or strength of satellite signals received by the positioning apparatus. If the first condition includes the elevation angle of the satellites, it can be at the range of 0-90 degrees. A preferred elevation angle of the satellites is at the range of 10-90 degrees. If the first condition includes the strength of satellite signals received by the positioning apparatus, carrier-to noise ratio (CNR) of the satellite signals can be at the range of 12-52 dB.

Figure 2:
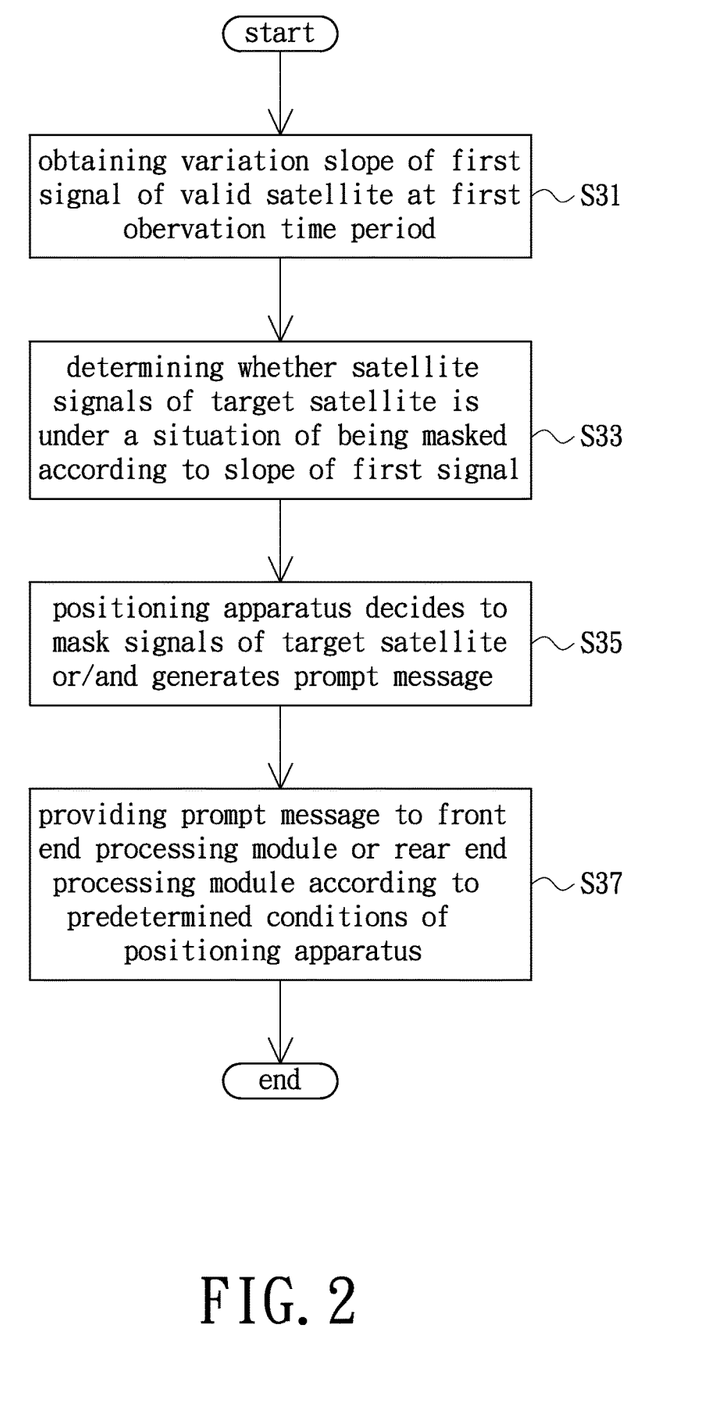
FIG. 2 is a flowchart of a method of judging deterioration of satellite status according to a preferred embodiment of the present invention.

Please refer to FIG. 2, which is a flowchart of a method of judging deterioration of satellite status according to a preferred embodiment of the present invention. Firstly, obtaining a signal variation slope of a first signal transmitted by a valid satellite at first observation time period Δt1 (S31). Determining whether the satellite signals of the target satellite needs to be masked according to the slope of the first signal (S33). Giving decision by the positioning apparatus to mask the satellite signals of the target satellite or/and generating a prompt message (S35), and sending the prompt message to a front end processing module (for examples, a positioning signal providing unit, a positioning chip employing hardware to work, or a software) or a rear end processing module (for example, application software) according to settings of the positioning apparatus (S37). In other words, what is firstly to do is to judge whether the slope of the first signal is deteriorated. If the slope of the first signal is certainly deteriorated, masking the satellite signals of the target satellite. In this application, masking the satellite signals means deleting the satellite signals or unemploying the satellite signals.

It is worthy to be mentioned that the method of judging deterioration of satellite status in this embodiment is directed to observation satellites, for facilitation to occupy less calculation resource. However, it is advised that this method can be performed on the basis of valid satellites if calculation resource is sufficient.

After generating the prompt message on step S35, subsequent process can be performed in two manners according to a relationship of the processing module and the judgment module. In one processing manner, the positioning signals transmitted from unqualified positioning satellites are firstly masked, that is, judgment result is outputted to the front end processing module so that the front end processing module selects other positioning satellites as sources to obtain positioning signals therefrom. In the other processing manner, the original positioning satellites are preserved as sources to obtain positioning signals therefrom, while the rear end processing module, assisted by auxiliary information, tells the user a prompt message that the satellites signals are interfered and at a particular time period the satellite signals without suitable strength would cause a positioning error.

Figure 3:
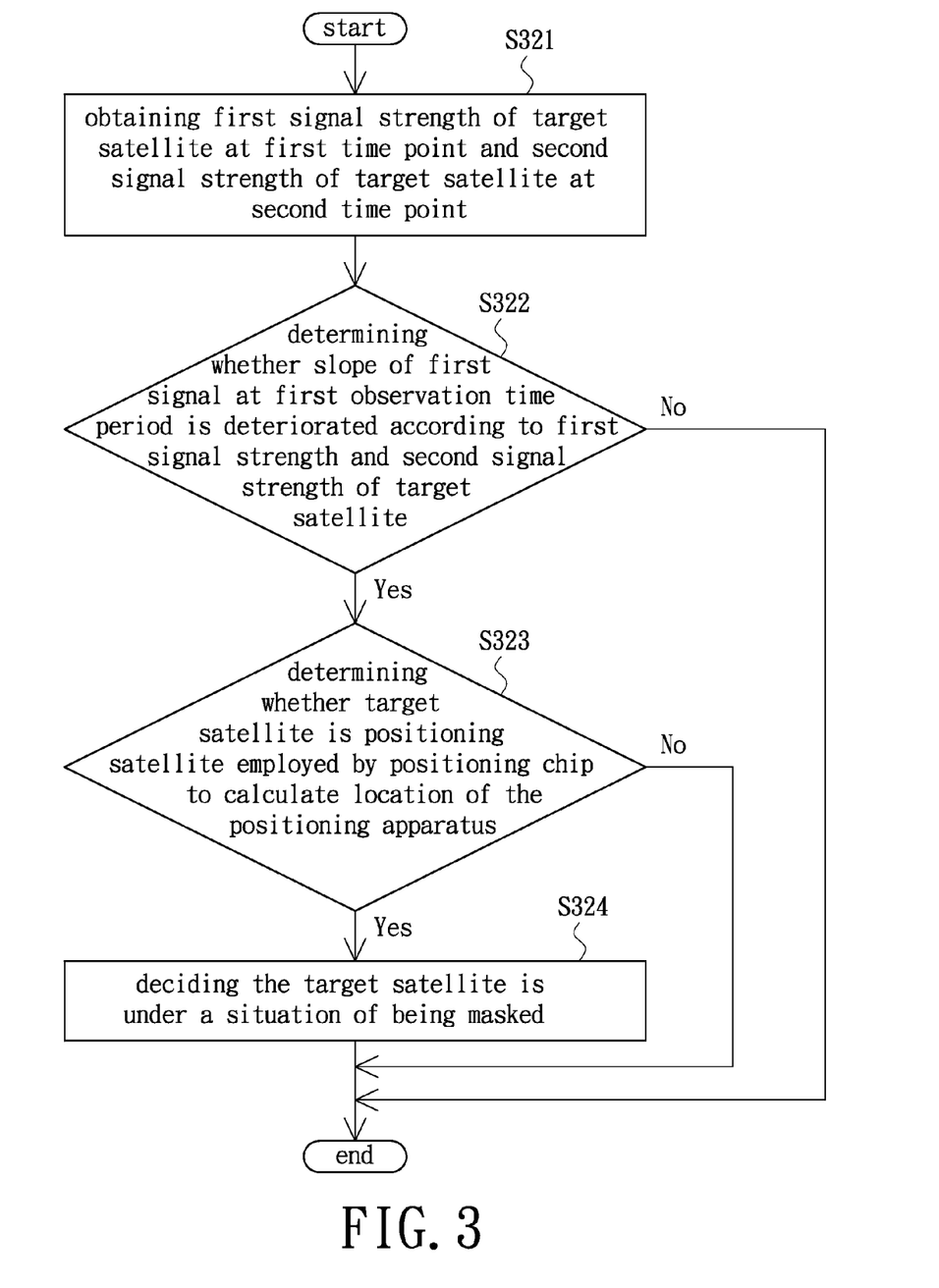
FIG. 3 is a flowchart of a method of deciding whether the satellites are under the situation of being masked according to a preferred embodiment of the present invention.

Please referring to FIG. 3, it is a flowchart of a method of deciding whether the satellites are under the situation of being masked, according to a preferred embodiment of the present invention. The first observation time period Δt1 is defined between a first time point t1 and a second time point t2. Obtaining a first signal strength $CNR_{t1}$ at the first time point t1, and a second signal strength $CNR_{t2}$ at the second time point t2 (S321). Determining whether the slope $CNR_{slope}$ of the first signal of the current target satellite is deteriorated at the first observation time period Δt1, according to the first signal strength $CNR_{t1}$ and the second signal strength $CNR_{t2}$ (S322). If the slope of the first signal of the target satellite is certainly deteriorated, then determining whether the target satellite is a positioning satellite employed by the positioning chip to calculate location of the positioning apparatus (S323). If yes, deciding the target satellite is under a situation of being masked (S324).

If the slope $CNR_{slope}$ of the first signal is deteriorated, that is, the slope of the first signal is a minus slope, and the slope is less than a predetermined threshold value (for example, choosing the slope equal to −3 as a threshold value) no less than a predetermined times (for example, three times), this indicates the strength of the first signal of the target satellites is certainly considerably deteriorated. Therefore, if the target satellite is one of the four positioning satellites for positioning the positioning apparatus, the target satellite needs to be under a situation of being masked. The first time point t1, the second time point t2, the predetermined threshold value and the predetermined times are used as examples for explanation, and not limited in practice.

Subsequently, the explanation of core process of the invention is on the basis of observation satellites selected according to the predetermined first condition. That is, after observation satellites are selected, signal variation slope in a particular observation time period can be obtained according to strength variation of the signals transmitted from the observation satellites, and when the positioning satellite selected from the observation satellites for purpose of position have a deteriorated slope of the satellites signals, stop using the positioning satellite or generate a warning message such as the position on the basis of the positioning satellites may have more error.

Figure 4:
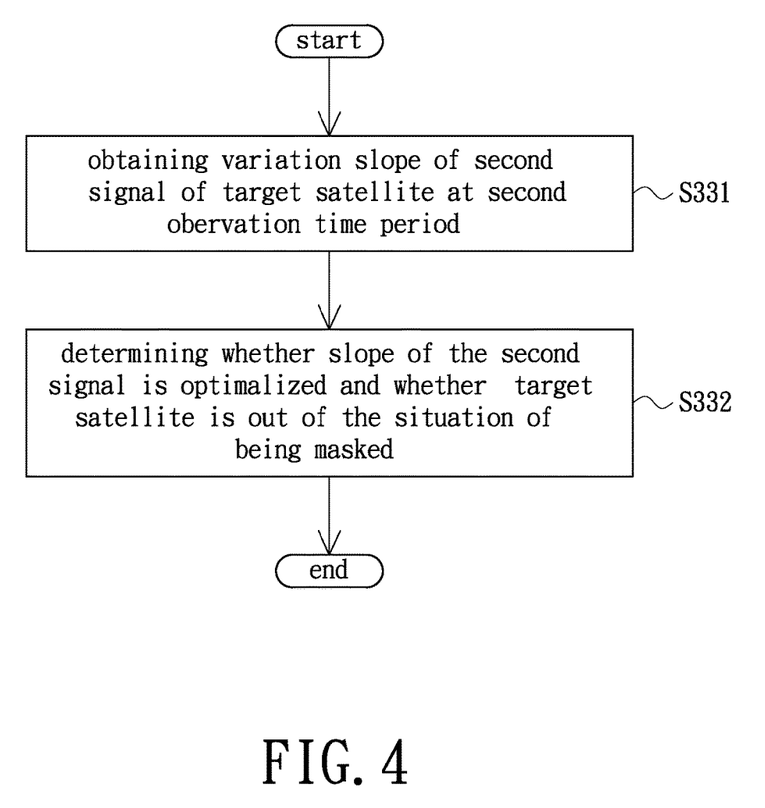
FIG. 4 is a flowchart of a method of determining whether the target satellite is out of the situation of being masked according to a preferred embodiment of the present invention.

Please refer to FIG. 4, which is a flowchart of a method of determining whether the target satellite is out of the situation of being masked according to a preferred embodiment of the present invention. Since strength of the signals transmitted from the target satellite would vary with a relative location between the target satellite and the positioning apparatus, the strength of the signals transmitted from the target satellite is still detected, though the target satellite is under the situation of being masked, so that a second signal variation slope of a second signal transmitted from the target satellite can be obtained at a second observation time period (S331); and determining whether the slope of the second signal is optimized and whether the target satellite is out of the situation of being masked (S332). The method of determining whether the satellites is out of the situation of being masked is similar to the method of deciding whether the satellites is under the situation of being masked as shown in FIG. 3, and detailed explanation thereof is omitted here.

The second observation time period here may have a same length as the first observation time period or not. The threshold value to judge whether the slope of the second signal is optimalized, is a positive slope. It is worthy to mentioned, the method of judgment satellite status introduced in the application cannot replace prior positioning methods using GPS, but is an auxiliary method which can assist the positioning apparatus to judge whether the signal and status of the presently used positioning satellite is suitable for position purpose. If the slope of the signal is deteriorated, it is determined that the positioning apparatus is not suitable to use the signals transmitted from the observation satellites, and a prompt message that the observation satellite is under a situation of being masked is generated.

Therefore, after it is judged whether the target satellite is under a situation of being masked, subsequent things are to send the judgment result of the satellite status to other related processing modules.

Figure 5A:
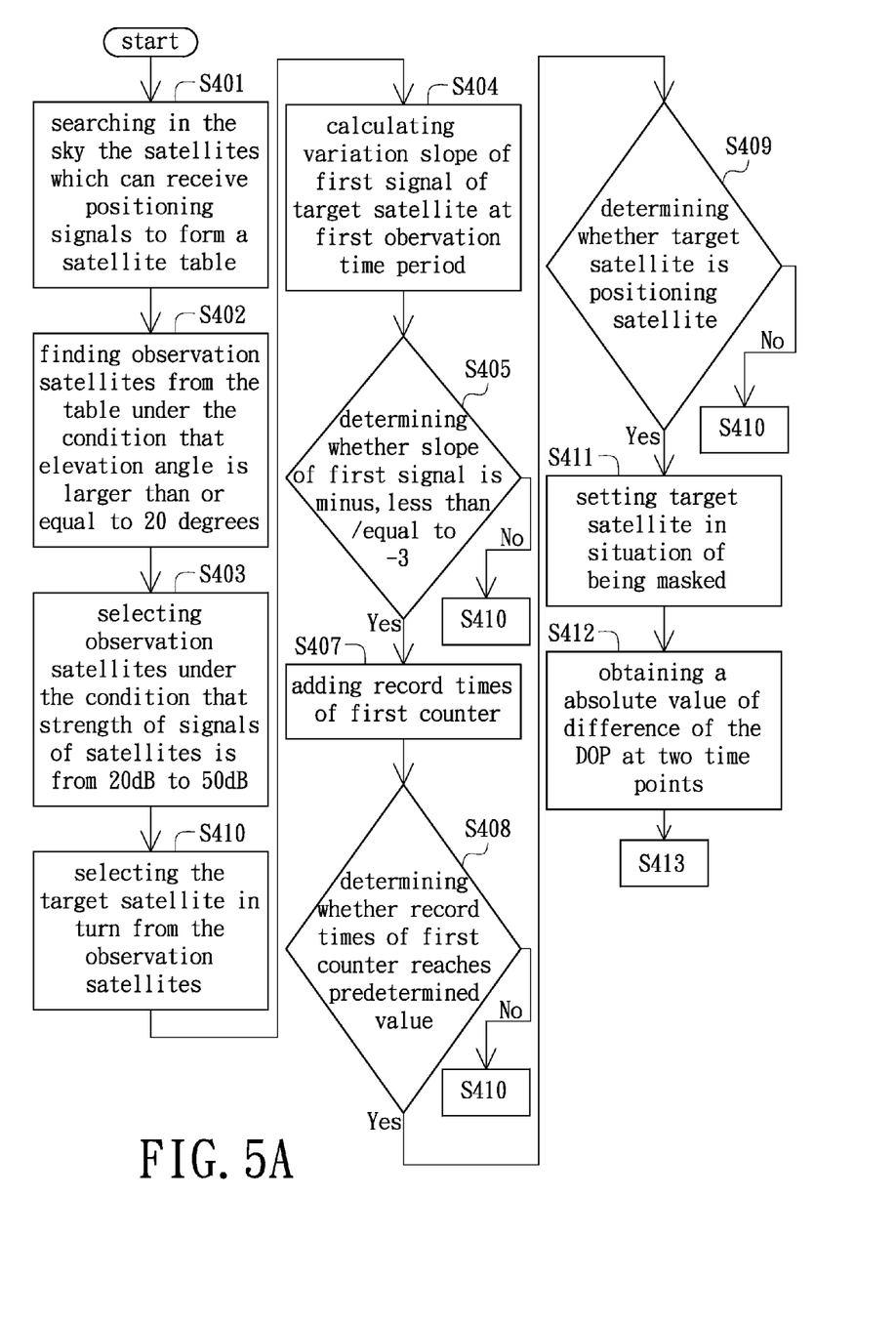
FIG. 5A and FIG. 5B are first and second portions of a flowchart of a judgment method according to another embodiment of the present invention.
Figure 5B:
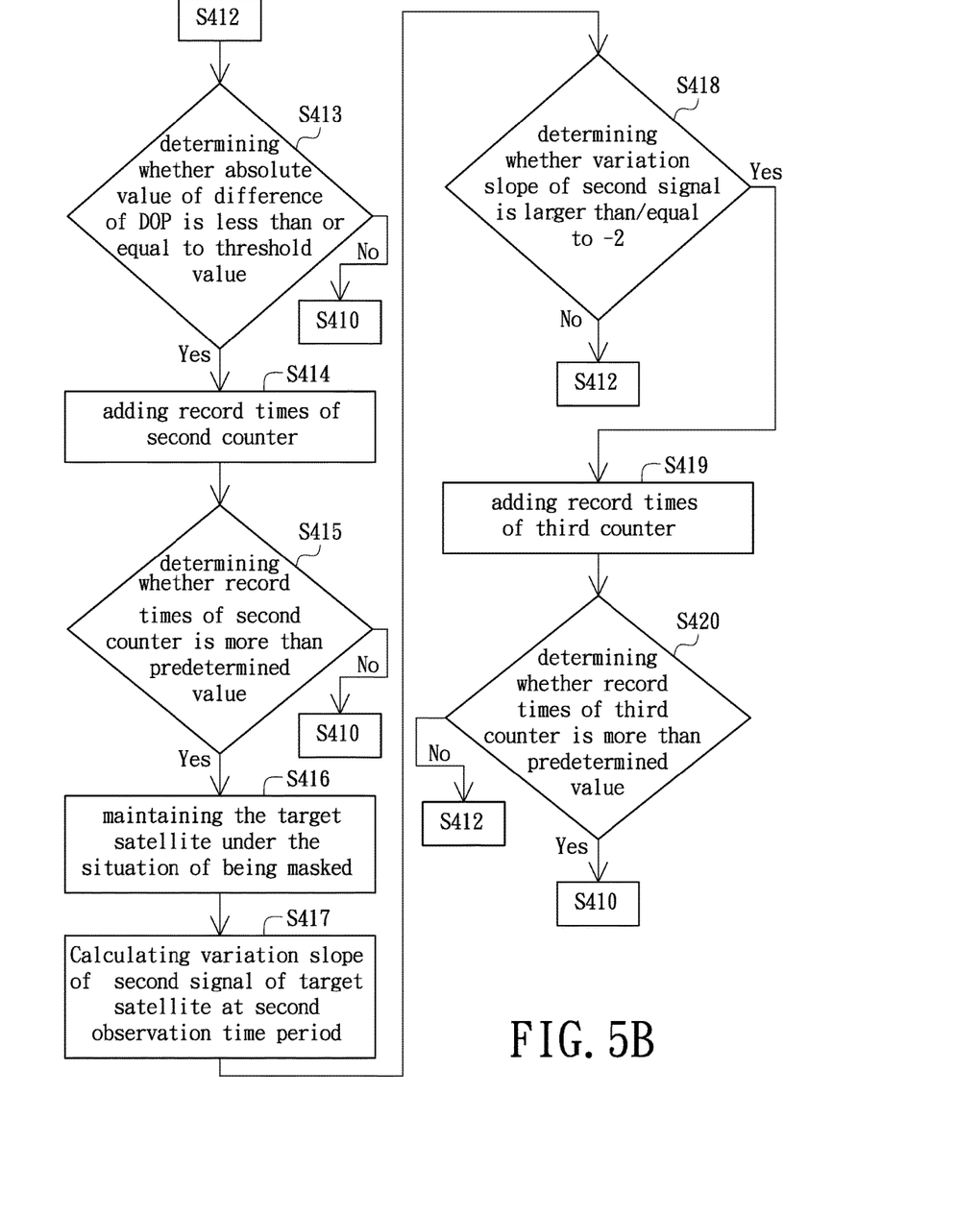

Please referring to FIG. 5A and FIG. 5B, they are first and second portions of a flowchart of a judgment method according to another embodiment of the present invention. The positioning apparatus searches in the sky the satellites which can receive positioning signals to form a satellite table (S401); then finding observation satellites out of the table under the condition that the elevation angle is larger than or equal to 12 degrees (S402); after that, selecting observation satellites under the condition that the strength of satellites signals is from 20 dB to 50 dB (S403), and selecting target satellites in turn from the observation satellites for judgment satellite status (S410).

Firstly, calculating the slope of the first signal of the target satellite at the first observation time period which is defined between, for example, a first time point of threshold 0 second and a second time point of 15$^{th}$ second (S404); comparing the calculated slope of the first signal with the predetermined deterioration condition, for example, judging whether the slope of the first signal is less than or equal to −3 (S405); if not, it is indicated that the signal strength of the target satellite are normal, and therefore selecting another one observation satellite to judge its status (S410).

If the slope of the first signal is less than or equal to −3, counting the times of the slope of the first signal satisfied with the deterioration condition, with the assistance of a first counter, and adding a record times of the counter (S407). Then, judging whether the record of the first counter reaches a predetermined value, such as two (S408); if not, selecting another one observation satellite to judge its status.

After that, what to be judged is whether the target satellite is a positioning satellite (409). According to the step S409, if the target satellite is not a positioning satellite, it is not needed to consider the affect of the target satellite on the positioning signals. Contrarily, the target satellite is set to be under the situation of being masked (S411).

It is to be judged using Dilution of Position (DOP), for example, obtaining a absolute value of difference of the DOP at two time points (such as, the 5th second and the threshold 0 second) (S412); determining whether the absolute value of difference of the DOP is less than or equal to a threshold value (such as 0.1) (S413); if yes, adding one times to the record times of a second counter (S414), otherwise circling back to the step S410. Then, judging whether the record times of the second counter is more than a predetermined value (S415); if yes, maintaining the target satellite under the situation of being masked (S416).

Calculating the slope of the second signal of the target satellite at the second observation time period (S417); comparing the calculated slope of the second signal with the predetermined optimal condition, for example, to judge whether the slope of the second signal is larger than or equal to −2 (S418).

If the slope of the second signal is larger than or equal to −2, it is indicated that the signal strength of the target satellite is improved, thus, departing from the judgment flow of whether the positioning satellite is under the situation of being masked, and continuing to judge the status of other observation satellites. However, to ensure that the improvement of signal strength of the target satellite is not accidental, a third counter is introduced to record the times of improvement of the signal strength of the positioning satellite. Detecting whether the signal strength of the positioning satellite is improved at a certain time interval, and recording the detecting result using the third counter. Once the signal strength of the positioning satellite is improved, the record times of the third counter is added one (S419). Then, judging whether the record times of the third counter is larger than a predetermined times (S420); if yes, it is indicated that the target satellite for positioning purpose is not yet needed to be under the situation of being masked, and the flow circles back to the step S410 to judge the status of other observation satellites. If the slope of the second signal is less than −2, then the flow circles back to step S412.

Certainly, at the step S411 and S416, when it has been judged that the signal strength of the positioning satellite is deteriorated, except that the positioning satellite is set to be under a situation of being masked, the status of the satellite being masked can be provided to other processing modules in a manner of prompt message as said before.

In general, when the GPS chip selects satellite for positioning purpose, can not provide the rear end system with the function of selecting the positioning satellite. Therefore, though the system has determined that the satellite should be under the situation of being masked, it is not sure that this message can be sent to the chip. Under this condition, the positioning apparatus may select via software to output the prompt message of the satellite status (such as, by means of sound prompt, warning picture prompt), to inform of the user that the positioning message calculated during this period may have an error due to undesirable signal strength of the observation satellite, and let the user to be care of the accuracy of the information.

It is worthy to be mentioned, though the embodiments is explained with GPS system, this invention is not limited to the embodiments and can be applied to various types of electronic apparatus in a manner of computer program, by means of storing the software on the computer program to perform the method of satellite status judgment by the electronic apparatus having positioning signal receiver. That is, obtaining the slope of the first signal of a target satellite at a first observation time period; determining whether the target satellite is under the situation of being masked according to the slope of the first signal; and generating a prompt message when the target satellite is under the situation of being masked.

When the user employs the positioning apparatus, the method of satellite status judgment introduced in the application can determine whether the satellite is under the situation of being masked according the strength of satellite signals and receiving condition of the satellite signals, so as to improve the problem that the positioning function of the positioning apparatus is affected by inferior satellite signals.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of satellite status judgment, the method comprising steps of:
   selecting, by a positioning apparatus, a plurality of observation satellites from a plurality of satellites according to a first condition;
   selecting, by the positioning apparatus, each of the observation satellites in turn as a target satellite;
   obtaining, by the positioning apparatus, a variation slope of a signal of the target satellite at a first observation time period, wherein the variation slope is determined according to a change in carrier-to noise ratio measurements of the signal over the first observation time period;
   determining, by the positioning apparatus, whether the target satellite should be masked according to the variation slope of the signal over the first observation time period;
   generating, by the positioning apparatus, a prompt message when it is determined that the target satellite should be masked;
   masking, by the positioning apparatus, positioning signals transmitted from the target satellite according to the prompt message;

obtaining the variation slope of the signal of the target satellite at a plurality of observation time periods subsequent to the first observation time period; and determining whether the variation slope of the signal has a positive slope for a predetermined number of subsequent observation time periods in a row greater than one, and if so, no longer masking the target satellite.

2. The method of satellite status judgment as recited in claim 1, wherein the first condition includes that an elevation angle of the satellite is from 0 to 90 degrees.

3. The method of satellite status judgment as recited in claim 1, wherein the first condition includes that carrier-to noise ratio of the satellite signals is at the range of 12-52 dB.

4. The method of satellite status judgment as recited in claim 3, wherein the target satellite is masked when the variation slope of the signal over the first observation time period is less than a predetermined threshold value.

5. The method of satellite status judgment as recited in claim 1, further generating a prompt message of error according to said prompt message.

6. The method of satellite status judgment as recited in claim 1, wherein the step of determining whether to mask the target satellite further comprises:
  determining, by the positioning apparatus, whether the variation slope of the signal over the first observation time period is deteriorated; and
  determining, by the positioning apparatus, whether to mask, the target satellite according to deterioration of the variation slope of the signal over the first observation time period.

7. The method of satellite status judgment as recited in claim 1, further comprising a step of providing the prompt message to a front end processing module or a rear end processing module.

8. The method of satellite status judgment as recited in claim 7, wherein the front end processing module is a positioning signal providing unit and the rear end processing module is software.

9. A non-transitory computer-readable medium encoded with computer-executable instructions that, when executed, cause an electronic apparatus to perform a method of satellite status judgment, the method comprising steps of:
  selecting a plurality of observation satellites from a plurality of satellites according to a first condition;
  selecting each of the observation satellites in turn as a target satellite;
  obtaining a variation slope of a signal of the target satellite at a first observation time period, wherein the variation slope is determined according to a change in carrier-to noise ratio (CNR) measurements of the signal over the first observation time period;
  determining whether the target satellite should be masked according to the variation slope of the signal over the first observation time period;
  generating a prompt message when it is determined that the target satellite should be masked;
  masking positioning signals transmitted from the target satellite according to the prompt message;
  obtaining the variation slope of the signal of the target satellite at a plurality of observation time periods subsequent to the first observation time period; and
  determining whether the variation slope of the signal has a positive slope for a predetermined number of subsequent observation time periods in a row greater than one, and if so, no longer masking the target satellite.

10. The non-transitory computer-readable medium as recited in claim 9, wherein the first condition includes that an elevation angle of the satellite is from 0 to 90 degrees.

11. The non-transitory computer-readable medium as recited in claim 9, wherein the first condition includes that carrier-to noise ratio of the satellite signals is at the range of 12-52 dB.

12. The non-transitory computer-readable medium as recited in claim 11, wherein the target satellite is masked when the variation slope of the signal over the first observation time period is less than a predetermined threshold value.

13. The non-transitory computer-readable medium as recited in claim 9, wherein the method further comprises generating a prompt message of error according to said prompt message.

14. The non-transitory computer-readable medium as recited in claim 9, wherein the step of determining whether to mask the target satellite further comprises:
  determining whether the variation slope of the signal over the first observation time period is deteriorated; and
  determining whether to mask the target satellite according to deterioration of the variation slope of the signal over the first observation time period.

* * * * *